(12) United States Patent
Poirot-Crouvezier

(10) Patent No.: US 8,029,938 B2
(45) Date of Patent: Oct. 4, 2011

(54) ELECTRIC POWER SOURCE COMPRISING A FUEL CELL WITHOUT DISCHARGE OF MATTER TO THE OUTSIDE AND CONTROL PROCESS OF SUCH A POWER SOURCE

(75) Inventor: Jean-Philippe Poirot-Crouvezier, Saint-Georges-de-Commiers (FR)

(73) Assignee: Commissariat l'Energie Atomique, Paris (FR)

( * ) Notice: Subject to any disclaimer, the term of this patent is extended or adjusted under 35 U.S.C. 154(b) by 1836 days.

(21) Appl. No.: 10/528,587

(22) PCT Filed: Oct. 1, 2003

(86) PCT No.: PCT/FR03/02881
§ 371 (c)(1),
(2), (4) Date: May 26, 2005

(87) PCT Pub. No.: WO2004/034495
PCT Pub. Date: Apr. 22, 2004

(65) Prior Publication Data
US 2005/0202300 A1    Sep. 15, 2005

(30) Foreign Application Priority Data
Oct. 11, 2002 (FR) ................................. 02/12682

(51) Int. Cl.
*H01M 8/04* (2006.01)
*H01M 8/10* (2006.01)

(52) U.S. Cl. .................. 429/443; 429/414; 429/514
(58) Field of Classification Search ............ 429/414, 429/443, 514
See application file for complete search history.

(56) References Cited

U.S. PATENT DOCUMENTS
3,014,976 A * 12/1961 Blackmer ............... 429/446
(Continued)

FOREIGN PATENT DOCUMENTS
JP    A-02-086070    3/1990
(Continued)

OTHER PUBLICATIONS

David S. Watkins; "Solid Polymer Fuel Cell Systems"; *Fuel Cell Systems*; Edited by Leo J. M. J. Blomen et al; pp. 518-519; 1993.

*Primary Examiner* — Gregg Cantelmo
(74) *Attorney, Agent, or Firm* — Oliff & Berridge, PLC

(57) ABSTRACT

The electric power source comprises a fuel cell and at least one flow channel the inlet and outlet whereof are respectively connected to a reactive fluid source and to a tank designed to contain the reactive fluid feeding the fuel cell and the water produced by the fuel cell. An inlet valve is arranged between the reactive fluid source and the inlet of the flow channel and is controlled by a control device. Once the tank has been filled with reactive fluid, the inlet valve is closed for a predetermined first time period. It is then opened for a predetermined second time period so as to evacuate the water accumulated in the fuel cell during the first time period to the tank, and to refill the tank with reactive fluid.

13 Claims, 8 Drawing Sheets

U.S. PATENT DOCUMENTS

| | | | |
|---|---|---|---|
| 3,479,224 A | 11/1969 | Jäger | |
| 4,037,024 A | 7/1977 | Landau | |
| 5,200,278 A | 4/1993 | Watkins et al. | |
| 5,798,186 A | 8/1998 | Fletcher et al. | |
| 6,562,498 B1 * | 5/2003 | Walsh | 429/434 |
| 2001/0010874 A1 * | 8/2001 | Herdeg et al. | 429/19 |
| 2004/0229087 A1 * | 11/2004 | Senner et al. | 429/13 |

FOREIGN PATENT DOCUMENTS

| | | |
|---|---|---|
| JP | A-11-214022 | 8/1999 |
| JP | A-2000-215902 | 8/2000 |
| JP | A-2000-243417 | 9/2000 |
| JP | A-2000-512068 | 9/2000 |
| JP | A-2001-6704 | 1/2001 |
| JP | 2002246049 A * | 8/2002 |

\* cited by examiner

US 8,029,938 B2

ELECTRIC POWER SOURCE COMPRISING A FUEL CELL WITHOUT DISCHARGE OF MATTER TO THE OUTSIDE AND CONTROL PROCESS OF SUCH A POWER SOURCE

BACKGROUND OF THE INVENTION

The invention relates to an electric power source comprising a fuel cell, at least one flow channel comprising an inlet and an outlet respectively connected to a reactive fluid source and to a tank, an inlet valve being arranged between the reactive fluid source and the inlet of the flow channel.

STATE OF THE ART

An electric power source comprising a low temperature fuel cell 1 of the Proton Exchange Membrane Fuel Cell (PEMFC) type, represented in FIG. 1, comprises an anode 2 and a cathode 3 separated by a membrane 4 letting $H^+$ protons pass. The anode 2 is the seat of a reaction the reagent whereof is hydrogen whereas a reaction between the $H^+$ protons formed at the anode 2 and oxygen takes place at the cathode 3. The anode 2 and cathode 3 are respectively supplied with hydrogen and oxygen, via flow channels 5a and 5b connected to reagent sources which can be on the one hand pure hydrogen or reformed hydrocarbons for the hydrogen source and, on the other hand pure oxygen or air for the oxygen source. The flow channels 5a and 5b are respectively bounded by the external wall of the anode and of the cathode and by the internal wall of plates 6a and 6b.

The water produced in the course of operation of the fuel cell generally stagnates in the flow channels 5a and 5b inside the fuel cell 1, slowing down and even stopping the reaction in the fuel cell. To obtain an electric power source with a good efficiency, the water present in the fuel cell therefore has to be evacuated. Indeed, if the water is not evacuated, it condenses in the cell and accumulates opposite the gas inlet, in the flow channels. Accumulation of water is liable to drown the fuel cell blocking access of the gases to the electrodes.

Evacuation of the water produced by the fuel cell is generally performed by mechanical conduction of the water, at the same time as the unconsumed reactive gas is evacuated. Thus, in FIG. 2, a power source comprising a fuel cell 1 enables continuous evacuation of the water produced to be performed at the outlet of the flow channels 5a and 5b, the inlets whereof are respectively connected to an oxygen source and to a hydrogen source. As the gas pressure in the fuel cell is higher than the external pressure downstream, the water produced in the fuel cell 1 is then driven mechanically out of the fuel cell, by the unconsumed reactive gas. The flow channels 5a and 5b each comprise a valve 7, formed in this case by a pressure relief valve, arranged at the outlet of the power source. This technique is particularly well suited for a continuous air or reformed fuel feed for which it is necessary to continuously evacuate the non-reactive compounds such as unconsumed nitrogen, in addition to the water produced.

The reactive gas feed being continuous, it is also possible to evacuate the water by performing periodic drains by means of the valves 7 constituting drain valves. The pressure in the cell is greater than the downstream external pressure and the unconsumed reactive gases expel the water, mechanically and in discontinuous manner, from the power source. This technique is often used for pure reagent sources and the frequency of the drain operations is from a few drains per minute to a few drains per hour. The continuous and discontinuous evacuation methods do however present the drawback of discharging gas or fluid emissions to outside the fuel cell.

A method called re-circulation enables discharges to be avoided. Thus in FIG. 3, the power source comprises a gas re-circulation device 8 arranged between the outlet and the inlet of the fuel cell 1. A pump enables the gas collected at the outlet of the cell to be re-injected into the inlet of the fuel cell 1. The water produced in the cell and evacuated by the flow channel 5b at the same time as the unconsumed reactive gas is then separated from the reactive gas in the re-circulation device which can for example be a condenser. The water is then evacuated to the outside or stored. For example, the document U.S. Pat. No. 5,798,186 describes a power source comprising an electrochemical cell. A hydrogen source and an air source are connected to the inlet of the electrochemical cell whereas a tank is connected to the outlet of the cell so as to collect the water formed and the hydrogen that has not reacted in the cell. A pressure regulator is arranged between the hydrogen source and the inlet of the cell and the hydrogen that has not reacted is redirected to the inlet of the cell, downstream from the pressure regulator, by means of an external pipe and a pump. This method called re-circulation avoids discharges, but it is complex to achieve and requires a bulky power source and a pump that is detrimental to the robustness of the power source.

It is also known to combine the continuous and discontinuous flow and re-circulation methods. For example, the document "Fuel cell systems" by Leo J. M. Blomen and Michael N. Mugerwa (Plenum Press—New York and London, 1993) describes, on pages 518 and 519, a power source comprising a fuel cell and a discontinuous flow system for the hydrogen flow channel and a re-circulation system for the channel reserved for the oxygen. These power sources are however bulky and require additional equipment that is hardly practical in a confined environment.

OBJECT OF THE INVENTION

It is one object of the invention to provide an electric power source comprising a compact, robust fuel cell, able to evacuate water from the fuel cell, without discharging matter to the outside of the electric power source.

According to the invention, this object is achieved by the fact that it comprises means for closing the inlet valve for a predetermined first time period and means for opening the inlet valve for a predetermined second time period much shorter than the first time period, so as to feed the fuel cell with reactive fluid from the tank, during the first time period, and, during the second time period, to fill the tank with reactive fluid and to evacuate the water accumulated in the fuel cell to the tank.

According to a development of the invention, the power source comprises two flow channels respectively connected on the one hand to first and second tanks and on the other hand to a hydrogen source and to an oxygen source.

According to another feature of the invention, the volume of the tank is much greater than the volume of reactive fluid contained in the fuel cell.

It is another object of the invention to provide an easy to perform control process of a power source such as the one above.

According to the invention, the control process comprises:
  the tank being filled with reactive fluid, closing of the inlet valve of the flow channel for a predetermined first time period,
  opening of the inlet valve for a predetermined second time period, so as to evacuate the water accumulated in the fuel cell during the first time period to the tank and to refill the tank with reactive fluid, the second time period being much shorter than the first time period.

According to a development of the invention, the second time period has a duration of about a few fractions of seconds.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
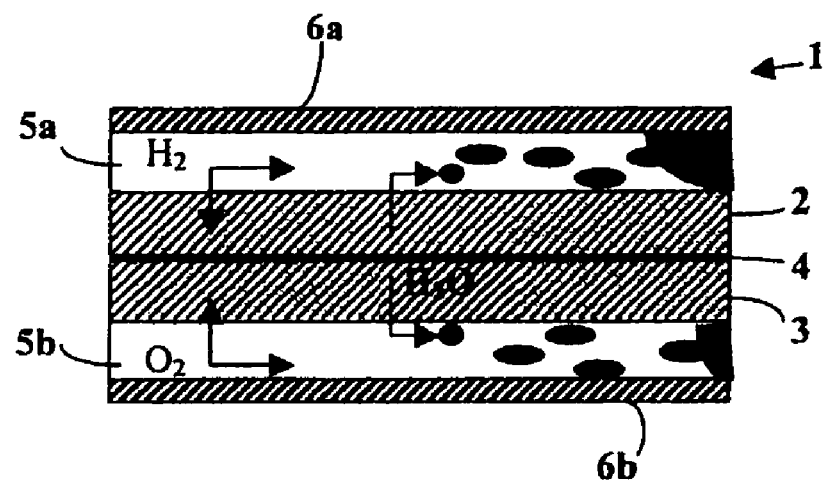
FIG. 1 schematically represents a PEMFC type fuel cell of a power source according to the prior art.
Figure 2:
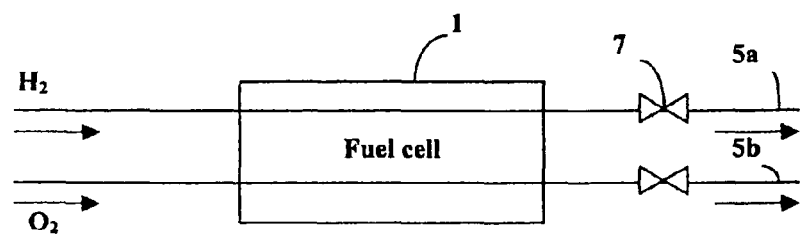
FIGS. 2 and 3 are schematic representations of electric power sources according to the prior art.
Figure 3:
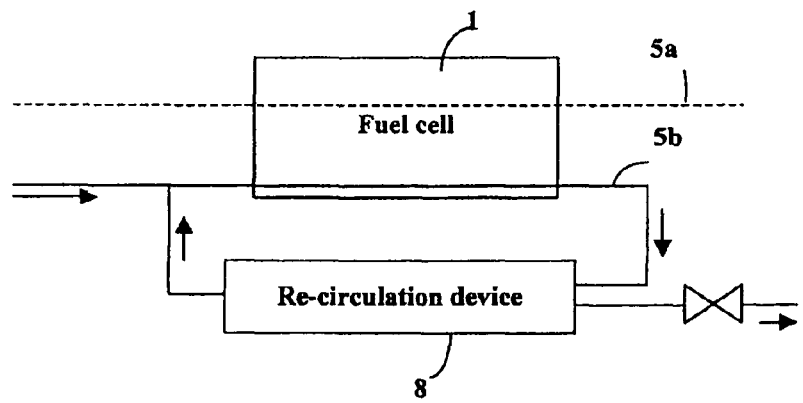
Figure 4:
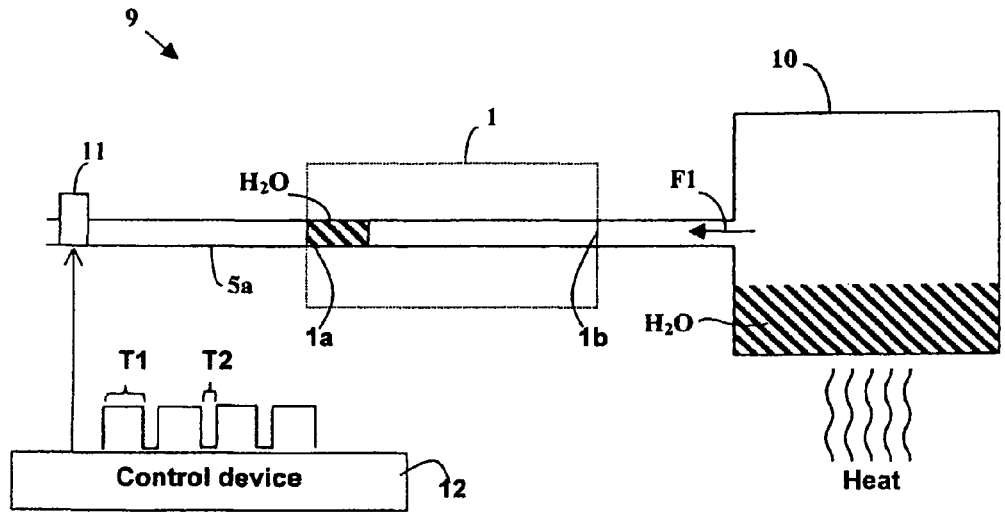
FIGS. 4 and 5 schematically represent a power source according to the invention, the inlet valve being respectively in the closed position and in the open position.

The electric power source, preferably used in a confined environment, comprises a fuel cell 1 and at least one flow channel 5a running through the fuel cell. In FIG. 4, the fuel cell 1 of PEMFC type is represented by an outline in dotted lines and comprises at least one inlet 1a and at least one outlet 1b connected to one another by a flow channel 5a. The flow channel 5a comprises an inlet, connected to a reactive fluid source (not shown) and arranged upstream from the inlet 1a of the fuel cell, and an outlet arranged downstream from the outlet 1b of the fuel cell, so as to feed the fuel cell with reactive fluid and to remove the water produced in the fuel cell. The power source 9 also comprises a tank 10 arranged on outlet from the flow channel 5a and an inlet valve 11 arranged between the reactive fluid source and the input of the flow channel 5a. Opening and closing of the inlet valve 11 are controlled by a control device 12. The tank 10 is designed to contain the reactive fluid feeding the fuel cell and water produced in the fuel cell. Its volume is greater than the volume of reactive fluid contained in the fuel cell, so as to be able to contain the quantity of water produced during a sufficiently long time of use of the power source.

Operation of the electric power source 9 is governed by a control process of the electric power source comprising two alternately repeated steps. The tank originally contains a reactive fluid designed to feed the fuel cell with reactive fluid. The tank is filled with reactive fluid by opening the inlet valve 11 by means of the control device 12. It preferably contains pure hydrogen if it is arranged on outlet of the flow channel corresponding to a hydrogen source, or pure oxygen if it is arranged on outlet of the channel corresponding to an oxygen source. The power source can also comprise two flow channels respectively connected on the one hand to first and second tanks and on the other hand to a hydrogen source and to an oxygen source.

Once the tank 10 has been filled, the inlet valve 11 of the flow channel 5a is closed (FIG. 4) for a predetermined, fairly long, first time period T1. Feeding of reactive fluid to the fuel cell 1 is then performed by means of the tank 10. In FIG. 4, flow of the reactive fluid when the inlet valve is closed is represented by the arrow F1 which is directed from the tank 10 to the outlet 1b of the fuel cell 1. Thus, feeding of reactive fluid to the fuel cell takes place via the outlet 1b of the fuel cell. The fuel cell consumes the reactive fluid and produces water, mainly in liquid form. If the reactive fluid is a gas, the quantity of gas inside the cell decreases progressively and causes a negative pressure inside the fuel cell 1. The water produced accumulates in the flow channel 5a, opposite the reactive fluid inlet, i.e. opposite the tank 10, at the inlet 1a of the fuel cell, throughout the first time period T1.

Figure 5:
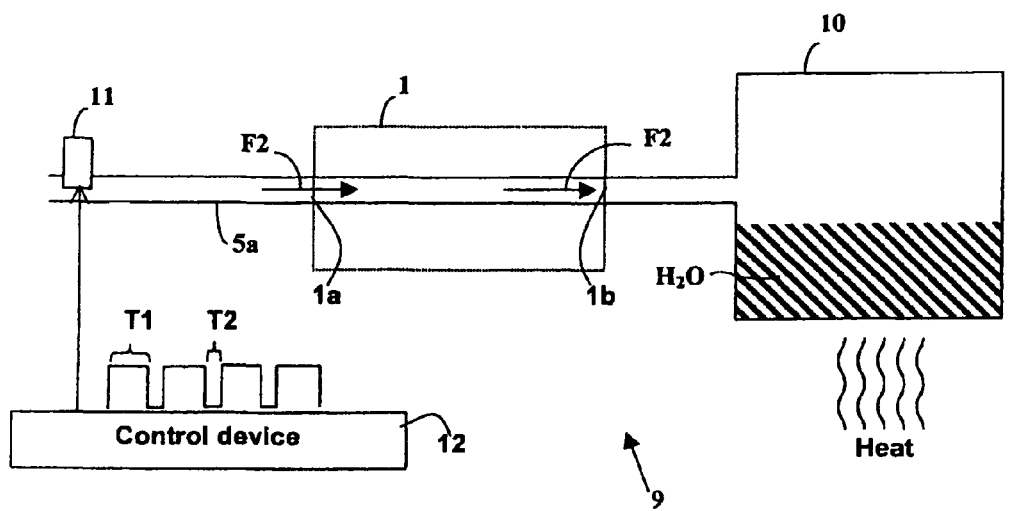
Figure 6:
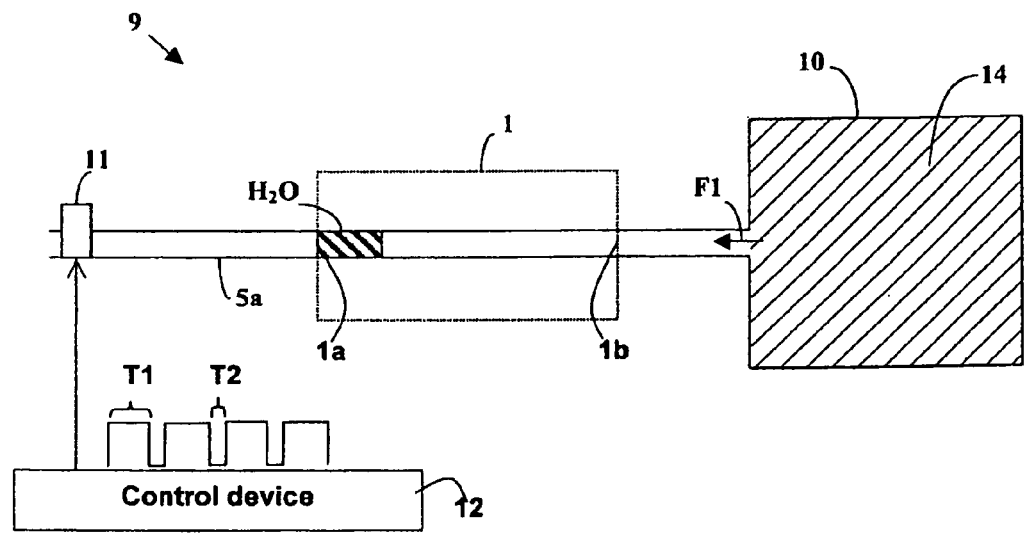
FIGS. 6 and 7 schematically represent a power source according to the invention, the inlet valve being respectively in the closed position and in the open position and the tank including a means for physical or chemical trapping of water.
Figure 7:
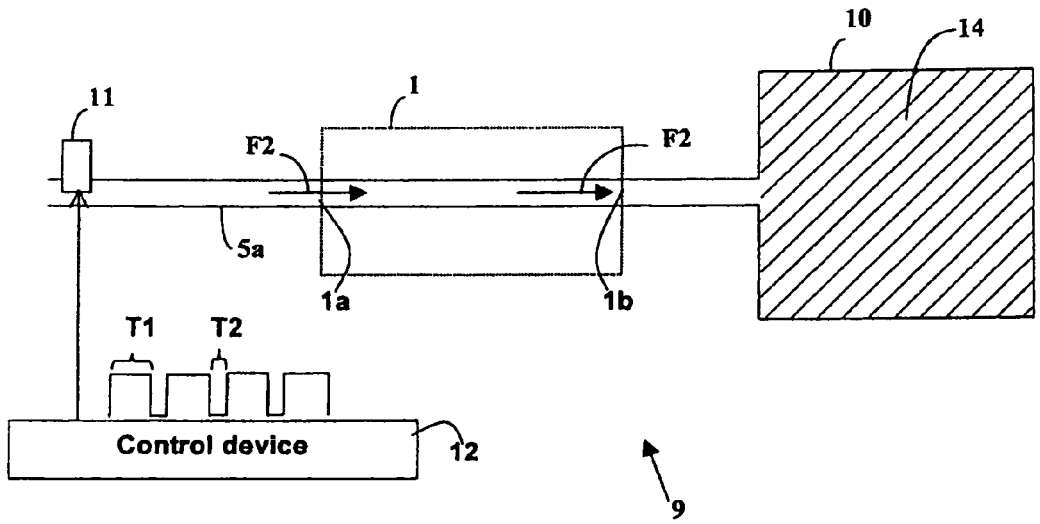
Figure 8:
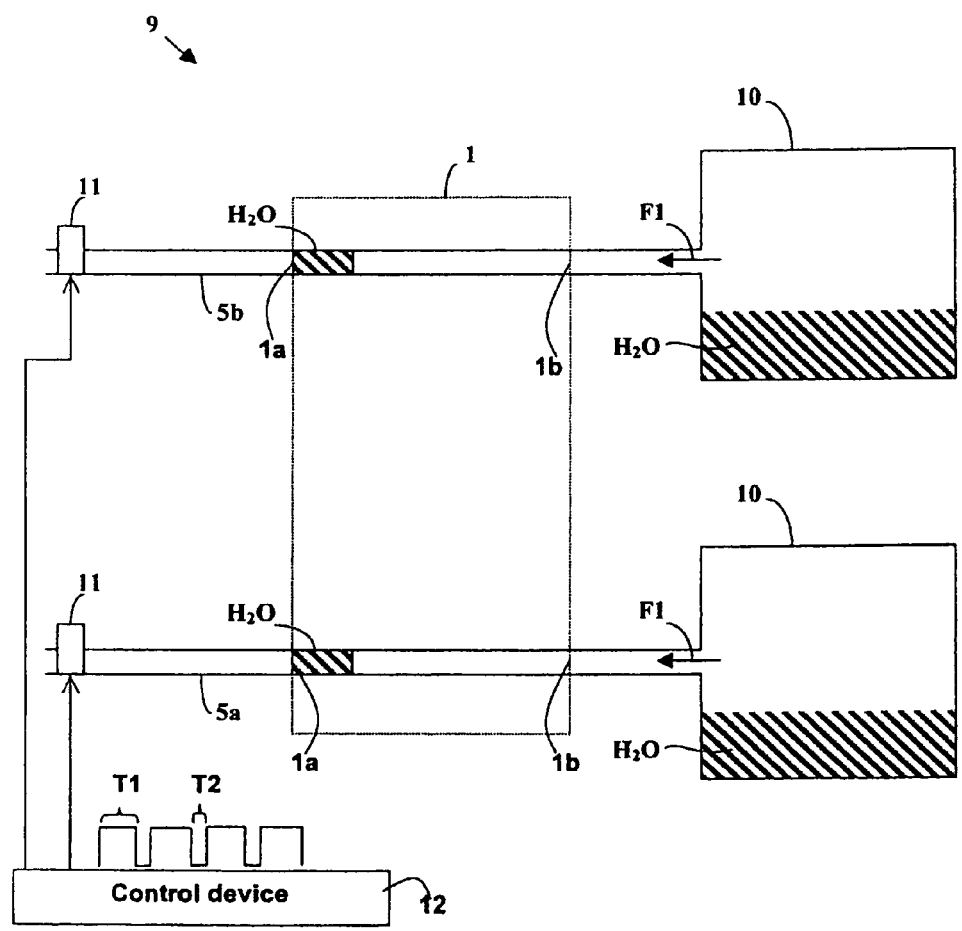
FIGS. 8 and 9 schematically represent a power source according to the invention, the inlet valve being respectively in the closed position and in the open position.
Figure 9:
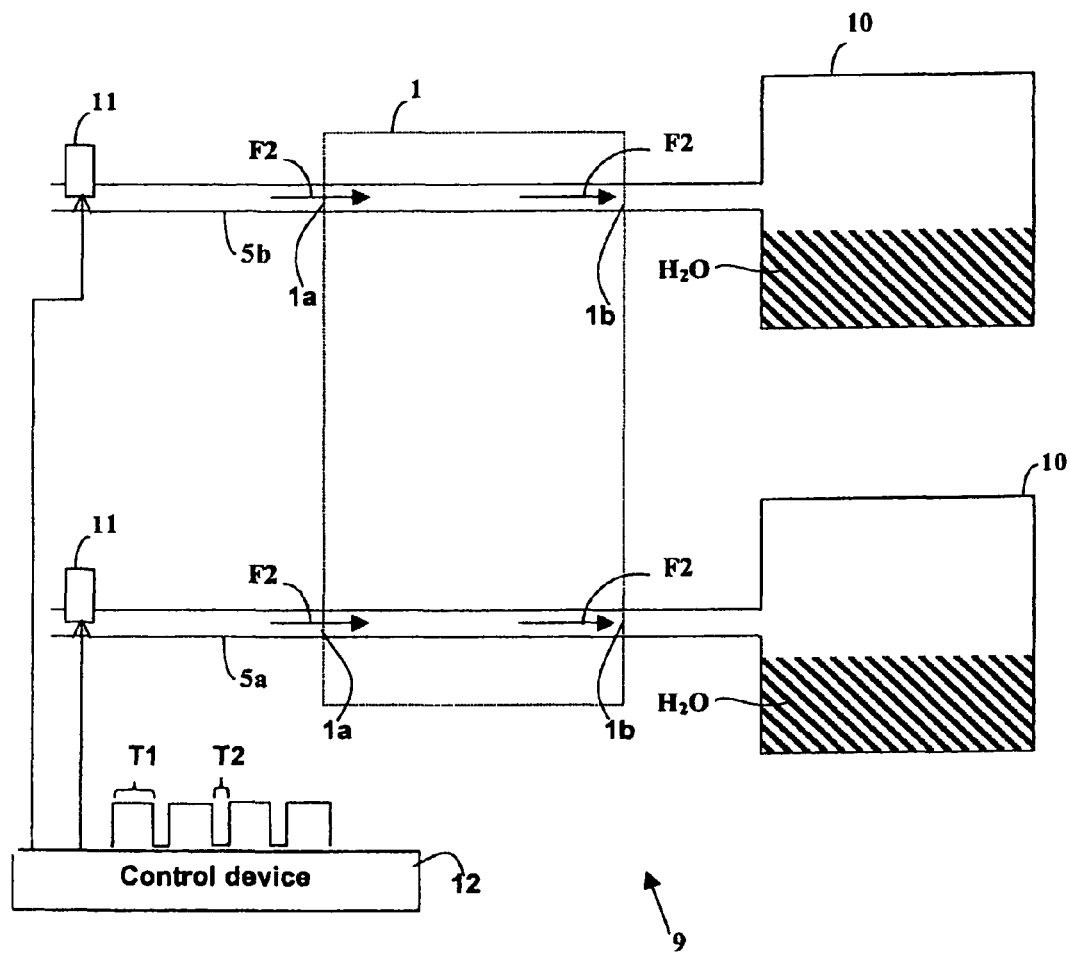
Figure 10:
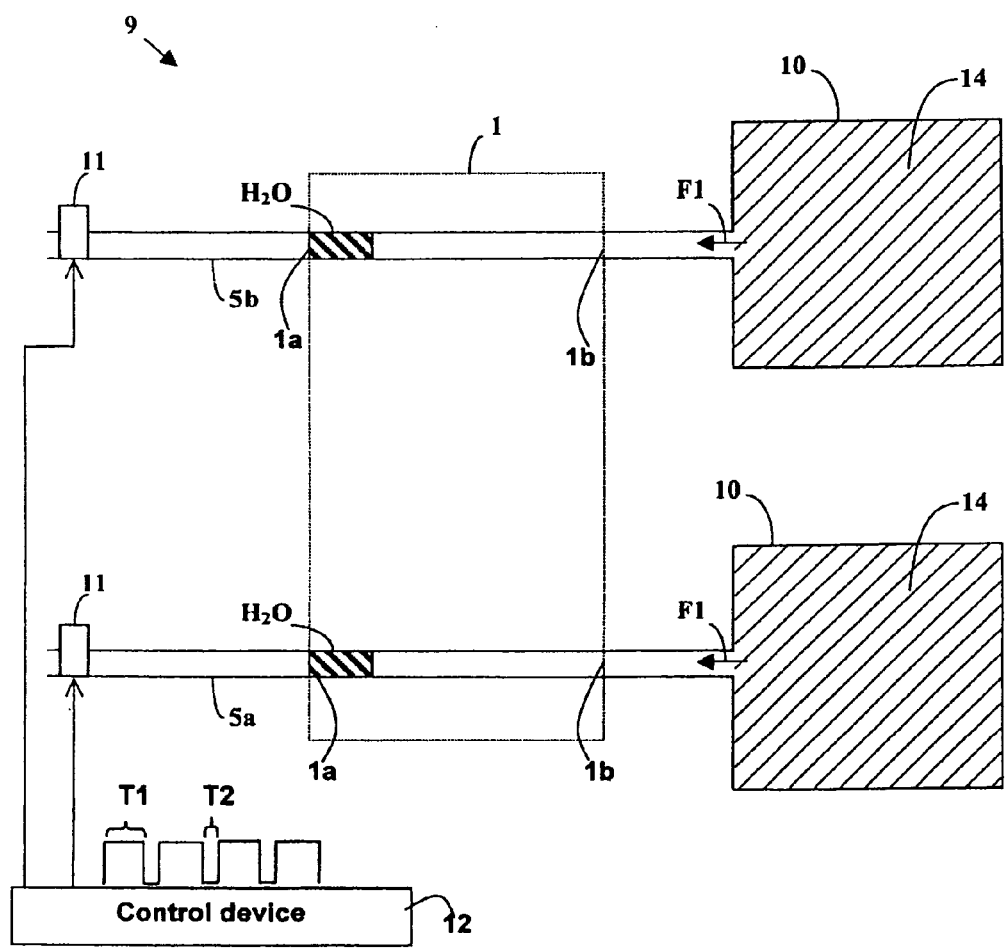
FIGS. 10 and 11 schematically represent a power source according to the invention, the inlet valve being respectively in the closed position and in the, open position and the tank including a means for physical or chemical trapping of water.
Figure 11:
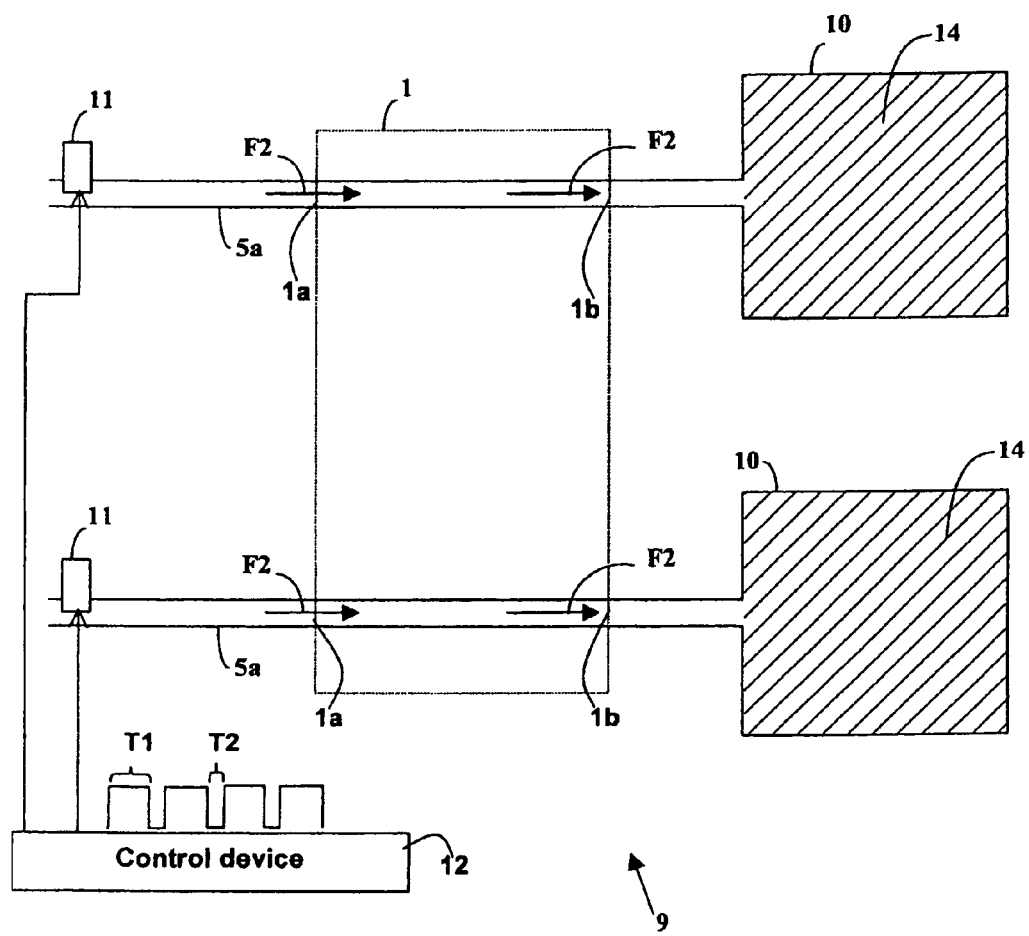

The inlet valve 11 is then opened for a second predetermined time period T2 (FIG. 5) so as to rebalance the pressure in the flow circuit 5a. Opening of the inlet valve, actuated by the control device 12, enables the water accumulated in the fuel cell during the first time period T1 to be periodically evacuated to the tank 10. The reactive fluid current reaching the inlet of the flow channel 5a drives the water accumulated at the inlet 1a of the fuel cell to the tank 10, and enables the tank 10 to be refilled with reactive fluid. In FIG. 5, the arrows F2 represent the flow movement of the reactive fluid flowing from the flow channel inlet to the tank 10, flowing through the fuel cell 1 from its inlet 1a to its outlet 1b. The second time period T2 is much shorter than the first time period T1. It preferably has a duration of approximately a few fractions of seconds. Thus, arranging a tank 10 at the outlet of the flow channel 5a and periodically actuating the inlet valve 11 arranged at the inlet of the flow channel enables the reactive fluid to be made to flow in the flow channel 5a alternately in one direction and in the other, and therefore enables the volume of the electric power source to be reduced by eliminating external re-circulation channels.

The tank is preferably arranged at a lower level than the fuel cell, so as to trap the water in the tank by gravity and therefore to prevent the water contained in the tank from returning to the fuel cell.

The tank can also comprise means 14 for physical or chemical trapping of the water to prevent the water contained in the tank from flowing to the fuel cell. The tank can, for example, comprise a porous material or a salt, occupying the volume of the tank and retaining the water by capillarity or by absorption. Porous materials or salts are particularly well suited for space applications where the absence of gravity makes gas-liquid separation more complex. The porous material can be of any type, for example, of metallic foam, ceramic, polymer or metallic felt type.

If the reactive fluid contained in the tank is a gas, the tank can be heated so as to keep its content at a temperature close to the operating temperature of the fuel cell. Humidification of the gas is then performed during the first time period, when the inlet valve is closed, which favors an optimum performance level for the fuel cell.

The volume of the tank is greater than the volume of reactive fluid contained in the fuel cell, so as to be able to contain the quantity of water produced during a sufficiently long time of use of the power source. For example, the tank can have a volume of 10 liters for a 10 kW cell, whereas the volume of reactive fluid contained in the fuel cell is 0.1 l/kW and the volume of water produced is 0.5 l/kWh. The water storage capacity then corresponds to at least 10 kWh.

The power source presents the advantage of not discharging gas to the outside of the electric power source and enables the water produced by the fuel cell to be stored for a fairly long period of time.

The invention is not limited to the particular embodiments described above. Thus the tank can be arranged inside the fuel cell, for example between the plates 6a and 6b.

Likewise, the invention, preferably applying to low temperature fuel cells and more particularly to PEMFC type cells, can also be applied to other types of fuel cells using pure reactive agents as fuel or combustion agent. Thus, it can apply to cells of AFC (Alkaline Fuel Cell), PAFC (Phosphor Acid Fuel Cell) or SOFC (Solid Oxide Fuel Cell) type.

The invention claimed is:

1. An electric power source comprising:
   a fuel cell;
   at least one flow channel that passes through the fuel cell, the flow channel including an inlet and an outlet;
   a reactive fluid source connected to the inlet of the flow channel:
   a tank connected to the outlet of the flow channel via an orifice in the tank, the orifice of the tank being the only opening of the tank that is connected to the fuel cell:
   an inlet valve arranged between the reactive fluid source and the inlet of the flow channel; and
   a controller configured to close the inlet valve for a predetermined first time period and configured to open the inlet valve for a predetermined second time period that is shorter than the first time period, wherein
   the closing of the inlet valve causes the fuel cell to be supplied with reactive fluid from the tank via the orifice of the tank and the opening of the inlet valve causes the tank to fill with reactive fluid and water from the fuel cell via the same orifice of the tank.

2. A power source according to claim 1, comprising two flow channels respectively connected on the one hand to first and second tanks and on the other hand to a hydrogen source and to an oxygen source.

3. A power source according to claim 1, wherein the tank is arranged at a lower level than the fuel cell so as to trap the water in the tank.

4. A power source according to claim 1, wherein the tank comprises means for physical or chemical trapping of the water.

5. A power source according to claim 4, wherein the means for physical or chemical trapping comprise a porous material.

6. A power source according to claim 4, wherein the means for physical or chemical trapping comprise a salt.

7. A power source according to claim 1, wherein the volume of the tank is greater than the volume of reactive fluid contained in the fuel cell.

8. A control process of a power source according to claim 1, comprising:
   closing the inlet valve of the flow channel for a predetermined first time period after the tank has been filled with the reactive fluid; and
   opening the inlet valve for a predetermined second time period, so as to evacuate the water accumulated in the fuel cell during the first time period to the tank and to refill the tank with reactive fluid, the second time period being much shorter than the first time period.

9. A process according to claim 8, wherein the second time period has a duration of about a few fractions of seconds.

10. A process according to claim 8, wherein the tank is heated so as to keep its content at a temperature close to an operating temperature of the fuel cell.

11. A power source according to claim 5, wherein the water is trapped via capillary action or absorption.

12. A power source according to claim 6, wherein the water is trapped via capillary action or absorption.

13. A process according to claim 8, wherein the inlet valve is repeatedly opened and closed.

* * * * *